United States Patent
Furlong et al.

(10) Patent No.: US 9,297,679 B2
(45) Date of Patent: Mar. 29, 2016

(54) FLOWMETER WITH A FLOW CONDITIONER FORMED BY A PROTRUSION HAVING RESTRICTION PROVIDED UPSTREAM OF THE MEASUREMENT SECTION

(71) Applicant: General Electric Company, Schenectady, NY (US)

(72) Inventors: Edward Randall Furlong, Billerica, MA (US); Xiaolei Shirley Ao, Billerica, MA (US); John Daniel Friedemann, Sandvika (NO); Colin James Mackenzie, Huncote (GB); Nataraja Aswathanarayana Nagaranavile, Bangalore (IN)

(73) Assignee: General Electric Company, Schenectady, NY (US)

( * ) Notice: Subject to any disclaimer, the term of this patent is extended or adjusted under 35 U.S.C. 154(b) by 129 days.

(21) Appl. No.: 14/154,931

(22) Filed: Jan. 14, 2014

(65) Prior Publication Data

US 2015/0198472 A1 Jul. 16, 2015

(51) Int. Cl.
*G01F 1/66* (2006.01)
*F15D 1/02* (2006.01)

(52) U.S. Cl.
CPC ..... *G01F 1/66* (2013.01); *F15D 1/02* (2013.01)

(58) Field of Classification Search
None
See application file for complete search history.

(56) References Cited

U.S. PATENT DOCUMENTS

| | | | |
|---|---|---|---|
| 4,381,668 A * | 5/1983 | Sato et al. | 73/202.5 |
| 5,383,369 A * | 1/1995 | Khuri-Yakub et al. | 73/861.29 |
| 6,026,693 A | 2/2000 | Baumoel et al. | |
| 6,494,105 B1 * | 12/2002 | Gallagher | 73/861.27 |
| 6,647,806 B1 * | 11/2003 | Estrada et al. | 73/861.28 |
| 6,871,534 B1 * | 3/2005 | Hamada et al. | 73/204.22 |
| 6,941,807 B2 * | 9/2005 | Frie et al. | 73/204.21 |
| 7,036,366 B2 * | 5/2006 | Emmert et al. | 73/202.5 |
| 7,287,437 B2 * | 10/2007 | Kroemer et al. | 73/861.25 |
| 7,819,022 B2 | 10/2010 | Hope | |
| 8,091,435 B2 | 1/2012 | Will et al. | |

(Continued)

FOREIGN PATENT DOCUMENTS

| | | |
|---|---|---|
| EP | 2267416 A1 | 12/2010 |
| JP | 2013178126 A | 9/2013 |

(Continued)

OTHER PUBLICATIONS

PCT Search Report and Written Opinion issued in connection with corresponding PCT Application No. PCT/US2015/011392 on Jun. 3, 2015.

*Primary Examiner* — Harshad R Patel
(74) *Attorney, Agent, or Firm* — Barclay Damon, LLP (57) ABSTRACT

Flowmeters are disclosed herein that include one or more flow path features for improving the measurement accuracy or other aspects of the flowmeter. A flowmeter can include an elongate body having a first end and a second end and a flow path extending between the first and second ends along a longitudinal axis. An ultrasonic transducer can be disposed in a measurement section of the flow path and configured to emit ultrasonic waves into a material flowing through the flow path. First and second protrusions can be formed in a conditioning section of the flow path upstream from the measurement section, the first and second protrusions extending radially inward from a sidewall of the flow path and being configured to reduce swirling flow through the measurement section.

23 Claims, 9 Drawing Sheets

(56) References Cited

U.S. PATENT DOCUMENTS

| | | | |
|---|---|---|---|
| 8,418,549 B2* | 4/2013 | Speldrich et al. | 73/202.5 |
| 8,429,983 B2 | 4/2013 | Furlong et al. | |
| 8,429,985 B2 | 4/2013 | Furlong | |
| 8,505,391 B1* | 8/2013 | Baumoel | 73/861.28 |
| 8,549,908 B2* | 10/2013 | Dalla Betta et al. | 73/202.5 |
| 2001/0037678 A1* | 11/2001 | Kamiya | 73/204.22 |
| 2006/0156827 A1* | 7/2006 | Lang et al. | 73/861.25 |
| 2009/0151472 A1* | 6/2009 | Brown et al. | 73/861.27 |
| 2009/0223306 A1* | 9/2009 | Brown et al. | 73/861.27 |
| 2013/0248044 A1 | 9/2013 | Shiga et al. | |
| 2014/0238148 A1* | 8/2014 | Priyadarshana et al. | 73/861.28 |

FOREIGN PATENT DOCUMENTS

| | | |
|---|---|---|
| WO | 20060028984 A2 | 3/2006 |
| WO | 2013129246 A1 | 9/2013 |

* cited by examiner

FLOWMETER WITH A FLOW CONDITIONER FORMED BY A PROTRUSION HAVING RESTRICTION PROVIDED UPSTREAM OF THE MEASUREMENT SECTION

FIELD

The subject matter disclosed herein relates generally to systems and methods for measuring flow.

BACKGROUND

Flowmeters measure various characteristics of flow within a pipe, for example by using various methods to convert pressure, temperature, and other measured parameters into flow rates or flow volumes. Accurate measurement of these characteristics can be critical, especially in industrial applications such as those in which a flowmeter is used to measure material flow in a chemical processing or petroleum refining plant. Flowmeters must therefore produce highly accurate measurements, even under extreme temperatures, flow rates, and pressures.

In addition, many industrial applications involve transport of materials that include more than one phase of matter (e.g., liquid and gas), also known as a multi-phase flow. In situations in which such a multi-phase flow is present, for example at or near a well head where liquid crude oil, natural gas, water, sand, and other materials may be present, few existing flowmeters are able to accurately measure or derive flow. Such inaccuracies can lead to problems in downstream systems and result in inaccurate valuations of the flow content and poor decisions regarding the management of the reservoir.

The use of ultrasound to measure flow is well established with many installations worldwide. A number of ultrasonic flowmeters have been developed to provide a direct measurement of flow velocity, including transit-time based systems in which one or more transmitting transducers and one or more receiving transducers are aimed towards a medium flowing through the flowmeter. An input voltage is applied to a transmitting transducer (transmitter) to cause it to transmit ultrasonic waves into the medium. These waves are received by a receiving transducer (receiver) and converted into an output voltage. The "time of flight" of the waves is determined by comparing the time at which the input voltage is applied to the time at which the output voltage is received.

The time required for an ultrasonic signal to travel against the flow (i.e., upstream), $t_{up}$, is longer than that required to travel with the flow (i.e., downstream), $t_{dn}$. The difference between upstream and downstream traveling times, $\Delta t$, is directly proportional to the flow velocity. Other flowmeter types have also been developed, including differential pressure, microwave, and Doppler ultrasound flowmeters.

There is an ongoing need for flowmeters with improved accuracy, and particularly for flowmeters that can accurately measure flow in multi-phase applications.

BRIEF DESCRIPTION

Flowmeters are disclosed herein that include one or more flow path features for improving the measurement accuracy or other aspects of the flowmeter. In some embodiments, the flowmeter includes a measurement section having a non-circular transverse cross-section in which one or more sensors for measuring flow are disposed. The non-circular measurement section can reduce distortion of ultrasonic waves, facilitate chordal measurements with flush-mounted transducers, and reduce the propagation distance between paired transducers. In some embodiments, the flowmeter includes a conditioning section with diametrically opposed longitudinal rib protrusions. The protrusions can reduce swirling flow, direct liquid components of a multi-phase flow towards the sidewalls of the flow path, and guide ballistic particles through the center of the flow path away from sensitive measurement devices.

In some embodiments, a flowmeter includes an elongate body having a first end and a second end, a flow path extending between the first and second ends along a longitudinal axis, and an ultrasonic transducer disposed in a measurement section of the flow path and configured to emit ultrasonic waves into a material flowing through the flow path. The measurement section has a non-circular transverse cross-section.

In some embodiments, a flowmeter includes an elongate member having a flow path extending along a longitudinal axis thereof, the flow path having a measurement section in which at least one sensor configured to measure flow through the flow path is mounted, the measurement section having a transverse cross-section defined by first and second opposed curved surfaces and third and fourth opposed planar surfaces.

In some embodiments, a flowmeter includes an elongate body having a first end and a second end, a flow path extending between the first and second ends along a longitudinal axis, an ultrasonic transducer disposed in a measurement section of the flow path and configured to emit ultrasonic waves into a material flowing through the flow path, and first and second protrusions formed in a conditioning section of the flow path upstream from the measurement section, the first and second protrusions extending radially inward from a sidewall of the flow path and being configured to reduce swirling flow through the measurement section.

In some embodiments, a flowmeter includes an elongate member having a flow path extending along a longitudinal axis thereof, the flow path including a measurement section in which at least one sensor configured to measure flow through the flow path is mounted and a conditioning section disposed upstream from the measurement section configured to reduce swirling flow through the measurement section.

BRIEF DESCRIPTION OF THE DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure. In the drawings, like numbering represents like elements between the drawings.

DETAILED DESCRIPTION

Flowmeters are disclosed herein that include one or more flow path features for improving the measurement accuracy or other aspects of the flowmeter. In some embodiments, the flowmeter includes a measurement section having a non-circular transverse cross-section in which one or more sensors for measuring flow are disposed. The non-circular measurement section can reduce distortion of ultrasonic waves, facilitate chordal measurements with flush-mounted transducers, and reduce the propagation distance between paired transducers. In some embodiments, the flowmeter includes a conditioning section with diametrically opposed longitudinal rib protrusions. The protrusions can reduce swirling flow, direct liquid components of a multi-phase flow towards the sidewalls of the flow path, and guide ballistic particles through the center of the flow path away from sensitive measurement devices.

Certain exemplary embodiments will now be described to provide an overall understanding of the principles of the structure, function, manufacture, and use of the devices, systems, and methods disclosed herein. One or more examples of these embodiments are illustrated in the accompanying drawings. Those skilled in the art will understand that the devices, systems, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

FIGS. 1-12 illustrate an exemplary embodiment of a flowmeter 100. The flowmeter 100 is an "insert" flowmeter configured to be installed as a modular unit in a flow system or pipeline. As shown, the flowmeter 100 includes a length of pipe 102 that defines a lumen or flow path 104 through which a medium flows. An inlet flange 106 and an outlet flange 108 are provided at either end of the flowmeter 100 to facilitate installation of the flowmeter in the larger flow system. It will be appreciated, however, that the inlet flange 106 and/or the outlet flange 108 can be omitted in favor of a welded or other connection. The flowmeter 100 also includes a plurality of bores or ports in which ultrasonic transducers 110 are installed. The transducers 110 can be oriented at any of a variety of angles with respect to the flow path 104 through the flowmeter 100, including a perpendicular orientation. In the illustrated embodiment, six transducers 110 are included and each is oriented at an oblique angle with respect to the flow path 104 through the flowmeter 100. It will be appreciated that any number of transducers or pairs of transducers can be incorporated. The flowmeter 100 can also include an electronics housing (not shown) in which circuits for controlling the transducers and calculating flow are disposed. Electrical conductors (not shown) couple the transducers to the circuits in the electronics housing. The flowmeter 100 can also include bores or ports in which various other sensors are disposed. For example, the illustrated flowmeter 100 includes a temperature sensor 112 (shown in FIG. 8), first and second microwave patch sensors 114, 116 (shown in FIG. 6) for cross correlation, and a microwave near field probe 118 (shown in FIG. 6). Unused bores or ports can be filled with dummy plugs.

In operation, a medium (e.g., gas, liquid, multi-phase, etc.) flows through the flow path 104 and the rate at which the medium is flowing is measured using a time of flight or other algorithm based on transmission and reception of ultrasonic waves by the transducers 110. Measured characteristics of the flow are reported to a user or a controller, which can take some action based on the measured characteristics, such as controlling a process, generating a log or report, valuing the flow, and so forth.

As discussed in further detail below, the flowmeter can include various flow path features for improving the accuracy, durability, or other characteristics of the flowmeter. For example, the flow path can include a flow conditioner for conditioning the flow upstream of a measurement zone. Alternatively, or in addition, one or more sections of the flow path (e.g., a measurement section in which the transducers are disposed) can have a non-circular cross-section. In some embodiments, the measurement sections disclosed herein can be used without a flow conditioner or with a flow conditioner that differs from those disclosed herein. In some embodiments, the flow conditioners disclosed herein can be used without a measurement section or with a standard measurement section having a circular cross-section. Also, as discussed in further detail below, the flow conditioner and/or the measurement section can optionally be provided as separate modular inserts which can be added to or removed from a flowmeter or section of pipe.

It will be appreciated that the illustrated flowmeter 100 is merely exemplary, and that the flow path features disclosed herein can be used with any of a variety of flowmeters as well as in applications that do not include a flowmeter. The flow path features disclosed herein can be used with transit-time flowmeters, differential pressure flowmeters, microwave flowmeters, Doppler flowmeters, correlation flowmeters, Transflection flowmeters, wetted or non-wetted arrangements, portable or dedicated flowmeters, and/or single or multiple channel flowmeters. Applications in which the flow path features disclosed herein can be used include water, waste water, process fluids, steam, chemicals, hydrocarbons, oil, gas, custody transfer, topside or upstream multi-phase, well head flow measurement, and so forth. Exemplary flowmeters with which the flow path features disclosed herein can be used include PANAFLOW, DIGITALFLOW, and SENTINEL flowmeters, available from GENERAL ELECTRIC COMPANY.

Figure 8:
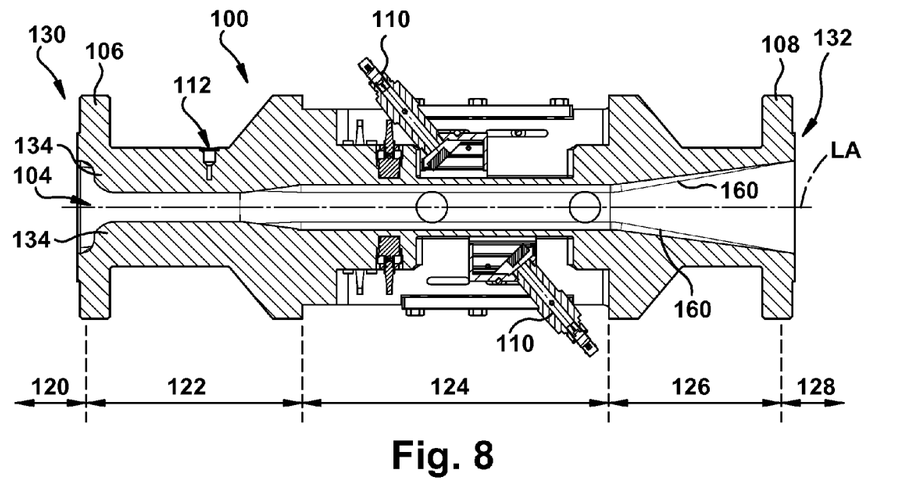
FIG. 8 is another longitudinal sectional view of the flowmeter of FIG. 1.

As shown in FIG. 8, the flow path 104 through the flowmeter 100 extends generally along a longitudinal axis LA and can be logically divided into five discrete sections: an inlet section 120, a conditioning section 122, a measurement section 124, a transition section 126, and an outlet section 128. While bidirectional and other complex flow may occur within the flowmeter 100, in general, the direction of flow is from an inlet end 130 of the flowmeter to an outlet end 132 of the flowmeter. The illustrated flowmeter 100 is approximately 24 inches in length. It will be appreciated, however, that the length can be increased or decreased depending on the diameter of the pipeline in which the flowmeter is installed and other factors.

Flow enters the flowmeter 100 through the inlet section 120 of the flow path 104. The inlet section 120 can be cylindrical and can have an inside diameter sized to substantially match the inside diameter of an upstream pipe through which flow is supplied to the flowmeter. In the illustrated embodiment, the inside diameter of the inlet section 120 is about 3.07 inches and the outside diameter of the inlet flange 106 is about 190 millimeters. It will be appreciated, however, that the flowmeter inlet 120, the inlet flange 106, or the entire flowmeter 100 can be scaled in size to fit pipelines of various dimensions.

Figure 9:
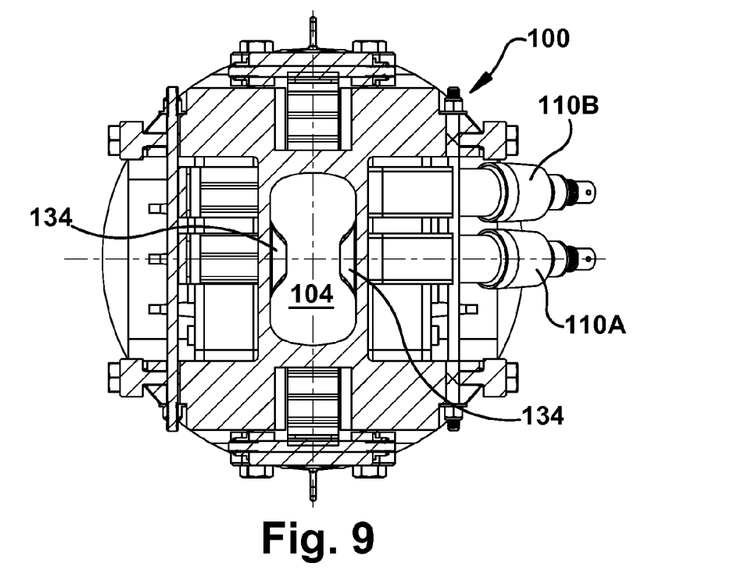
FIG. 9 is a transverse sectional view of the flowmeter of FIG. 1.
Figure 10:
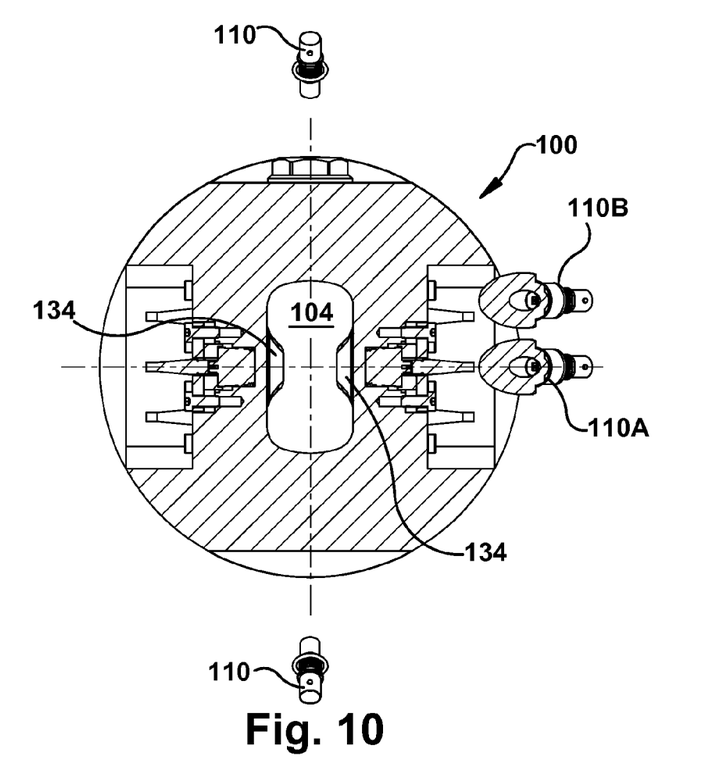
FIG. 10 is another transverse sectional view of the flowmeter of FIG. 1.

After passing through the inlet section 120, the flow enters the flow conditioning section 122. The flow conditioning section 122 includes one or more protrusions 134 configured to alter or modify one or more characteristics of the flow before it reaches downstream portions of the flow path 104. The illustrated flow meter 100 includes first and second protrusions 134, though it will be appreciated that any number of protrusions can be included. In addition, while the illustrated protrusions 134 are formed at diametrically-opposed positions, the protrusions can be formed at any of a variety of positions about the circumference of the flow path 104. The first and second protrusions 134 extend radially inward from the interior sidewall of the flowmeter 100. The first and second protrusions 134 of the illustrated flowmeter 100 are identical in shape, though different shapes can be used when a plurality of protrusions are included in the flowmeter. For example, a first pair of protrusions can have a first shape while a second pair of protrusions have a second shape that differs from the first shape. Alternatively, each of the protrusions can have a shape that differs from that of all other protrusions. As shown in FIG. 9, the diametrically-opposed protrusions 134 are aligned with the center of the planar sidewalls of the non-circular measurement section 124, discussed further below. In other embodiments, the protrusions can be disposed at other positions about the circumference of the flow path 104.

Figure 13:
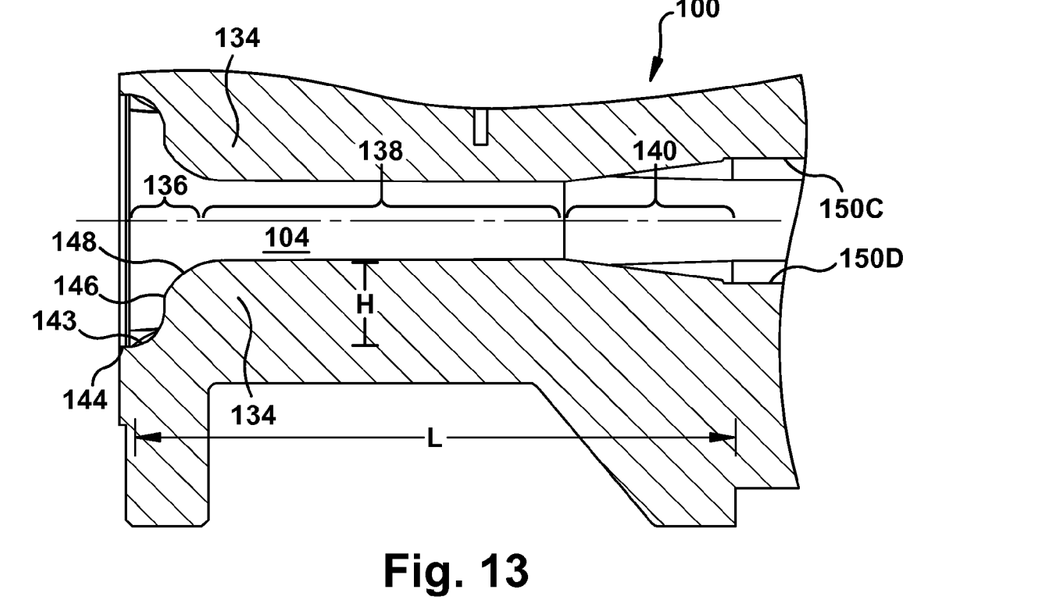
FIG. 13 is a longitudinal sectional view of a protrusion of the flowmeter of FIG. 1.
Figure 14:
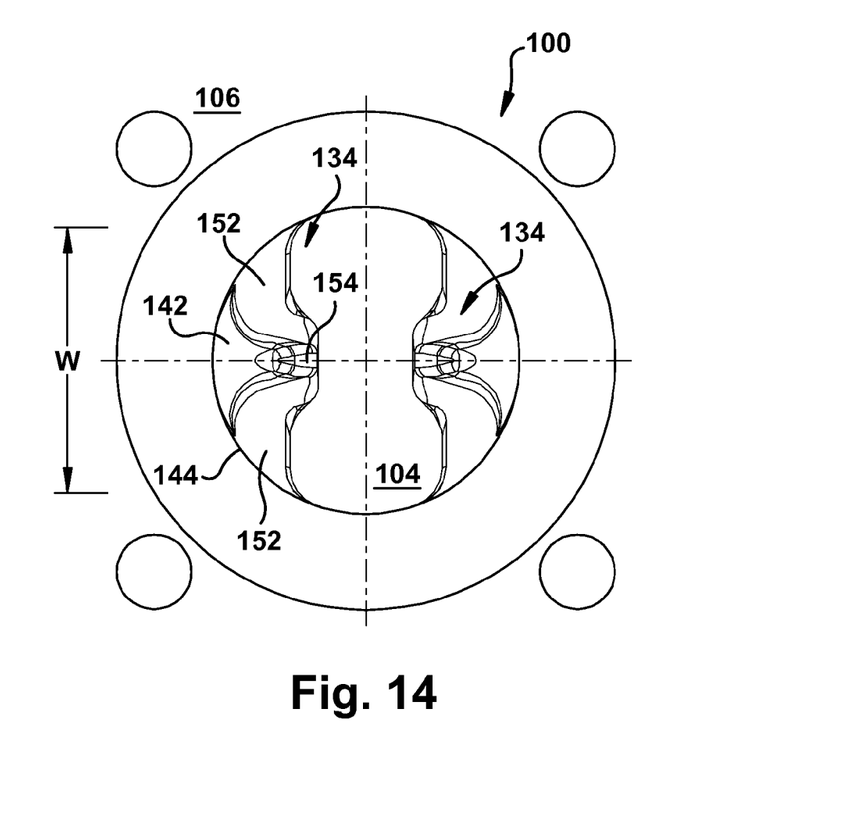
FIG. 14 is an end view of a protrusion of the flowmeter of FIG. 1.
Figure 15:
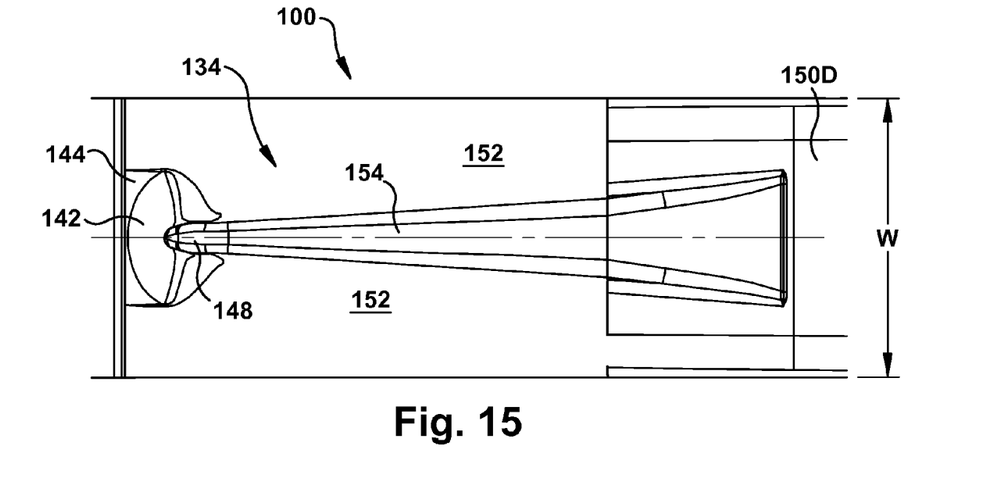
FIG. 15 is a plan view of a protrusion of the flowmeter of FIG. 1.

FIGS. 13-15 are close-up views of the protrusions 134. The protrusions 134 have a height H measured in a radial direction from the sidewall of the flow path towards the center of the flow path, a length L measured in a longitudinal direction, and a width W measured in a transverse direction.

As shown in FIG. 13, a longitudinal cross-section of each protrusion 134 taken along a radius of the flow path and through the center of the protrusion has a height profile that includes an entrance ramp section 136, a fixed height section 138, and an exit ramp section 140. The entrance ramp section 136 is defined by a concave ramp 142 that begins at the sidewall 144 of the flow path 104 and transitions at an inflection point 146 to a convex ramp 148 which leads into the fixed height section 138. The fixed height section 138 has a constant height along its length and defines the peak height of the protrusion 134. The exit ramp section 140 is defined by a tapered or straight-line ramp that descends from the peak height to the sidewall 150 of a non-circular portion of the measurement section 124, described in further detail below. The height profile of the protrusion 134 in a central longitudinal cross-section is thus generally fin-shaped with a blunt leading end and a tapered trailing end.

As shown in FIG. 14, the height of each protrusion 134 on either side of the central longitudinal plane descends along a substantially concave path until it transitions smoothly to the sidewall 144 of the flow path 104. The average slope at which the height descends towards the sidewall 144 decreases towards the trailing or outlet end of the protrusion 134. Accordingly, as best seen by viewing from the leading or inlet end as in FIG. 14, the protrusion 134 defines first and second ramps 152 on either side of a center peak 154 that climb in the longitudinal direction from the sidewall 144 of the inlet section 120 to the sidewall 150 of the non-circular portion of the measurement section 124. In other words, as shown in FIG. 15, the width of the center peak 154 increases towards the trailing end of the protrusion 134, while the width of the first and second ramps 152 formed on either side of the peak decreases.

The conditioning section 122 thus provides a smooth transition in the longitudinal direction between the circular transverse cross-section of the inlet section 120 and the non-circular transverse cross-section of the measurement section 124. In addition, the center peak portions 154 of the protrusions 134 form longitudinal ribs that extend into the pipe 102 and disrupt helical or corkscrew flow swirling along the sidewall of the flow path 104. The flow is instead steered or directed longitudinally, substantially eliminating swirling components of the flow. This can advantageously reduce further mixing of the individual flow components as the flow travels through the measurement section 124, which can improve measurement accuracy. A blinded T or other known mixing device can be installed upstream of the flowmeter 100 such that the flow is well-mixed before entering the conditioning section 122.

In some embodiments, the peak height of the protrusions 134 can be less than the radius of the inlet section 120, such that a longitudinal path through the center of the pipe 102 remains open or unconstrained. This can allow rocks or other ballistic particles to pass through the pipe, unlike screen-type flow conditioners which can impede such particles depending on relative size. The height of the protrusions 134 can be selected to balance the size of the clear center path with the degree of swirling that is acceptable. For example, when only small particles are expected to be passed through the flowmeter 100, the height of the protrusions 134 can be increased to remove more swirling. On the other hand, when large particles are anticipated, the height of the protrusions 134 can be reduced to enlarge the clear center path at the expense of some additional swirling. In general, even when the height of the protrusions 134 is reduced, the clear center path represents only a small portion of the overall cross-sectional area of the flow path 104, and therefore swirling is still reduced to an acceptable level.

In addition to straightening swirling flow, the conditioning section 122 can provide advantages in multi-phase flow applications. In a cylindrical pipe with multi-phase flow, liquid tends to flow along the outside of the flow path while gas tends to flow through the center, particularly when the pipe is oriented vertically. Use of a basic ramp to transition to the non-circular portion of the measurement section 124 could therefore produce a nozzle effect, aiming the liquid flowing along the periphery of the pipe towards the center. The illustrated protrusions 134, on the other hand, guide liquid back out towards the sides of the flow path 104, which can improve the accuracy of wet gas flow measurements. In particular, the protrusions 134 can help maintain or improve separation of gas and liquid phases of the flow. With the flow separated in this manner, centerline transducers or chordal transducers aimed near the middle of the flow path 104 can be optimized for gas measurement. At the same time, chordal transducers aimed near the periphery of the flow path 104 can be optimized for liquid measurement.

In addition, guiding the liquid components of the flow towards the sidewalls can provide durability benefits, since sand and other particles that could erode or otherwise damage transducers mounted in the measurement section 124 are guided towards the middle of the pipe away from the transducers, with the fluid flowing along the sidewalls of the pipe providing a protective barrier.

In embodiments in which flow conditioning is not necessary or desired, the conditioning section 122 can be replaced with an inlet transition section, e.g., a mirror of the outlet transition section 126 discussed further below.

In some embodiments, the conditioning section 122 can include one or more embedded elements or components. For example, one or more of the protrusions 134 or other portions of the conditioning section 122 can include an embedded temperature well. This can allow the temperature sensor to be positioned closer to the middle of the flow path, which can provide a more accurate measurement of the flow temperature than positioning the sensor near the sidewall or on the exterior of the pipe. Incorporating the temperature well into a protrusion 134 prevents the temperature well from impeding flow and shields the temperature well from being damaged or eroded by the flow. The temperature well can be accessible from a bore formed in the sidewall of the pipe, such that the temperature sensor can be removed and recalibrated from outside of the pipe.

By way of further example, one or more of the protrusions 134 or other portions of the conditioning section 122 can include an embedded thickness gauge. The thickness gauge can be configured to measure the thickness of the protrusion 134 over time to infer the degree to which the protrusion has eroded or to generally measure wear of the flowmeter. Exemplary thickness gauges include ultrasonic thickness gauges which are well known in the art.

As another example, one or more of the protrusions 134 or other portions of the conditioning section 122 can include an embedded corrosion sensor. The corrosion sensor can be configured to measure changes in electrical resistance over time to determine whether the flowmeter is being damaged by corrosive components of the flow. Any of a variety of corrosion sensors well known in the art can be incorporated into the conditioning section 122.

One or more of the protrusions 134 or other portions of the conditioning section 122 can also include various types of embedded sensors, including pressure sensors, pH sensors, and so forth.

Figure 19:
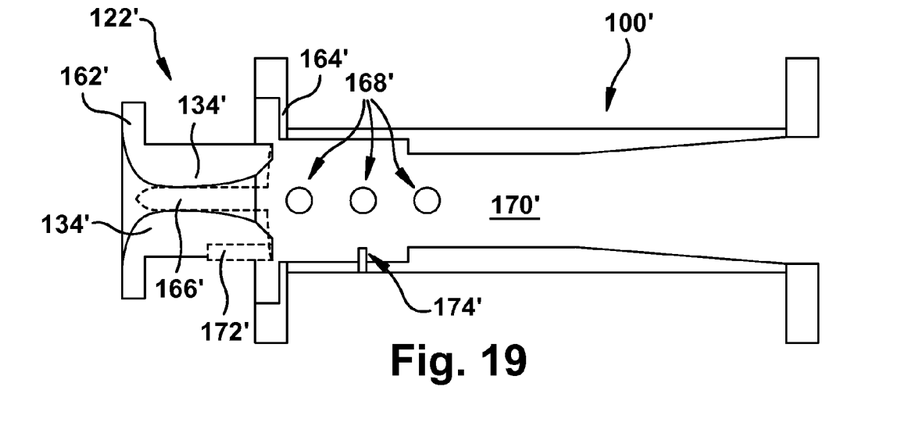
FIG. 19 is a schematic longitudinal sectional view of a flowmeter and an exemplary removable insert flow conditioner.
Figure 20:
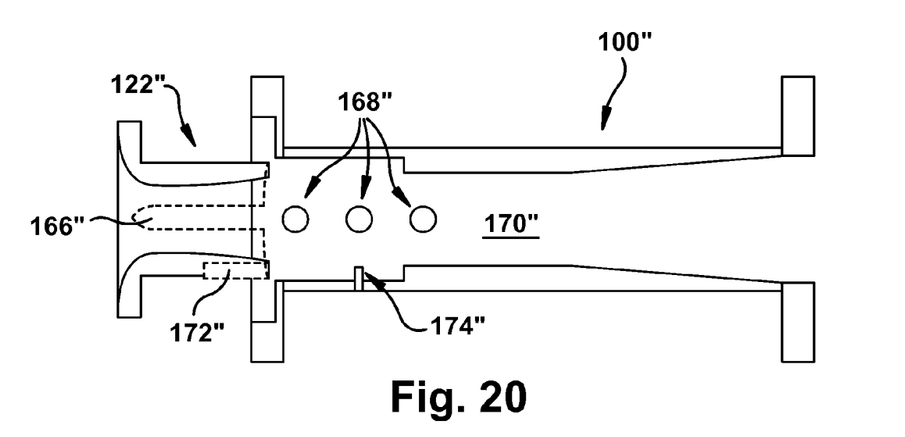
FIG. 20 is a schematic longitudinal sectional view of a flowmeter and another exemplary removable insert flow conditioner.
Figure 21:
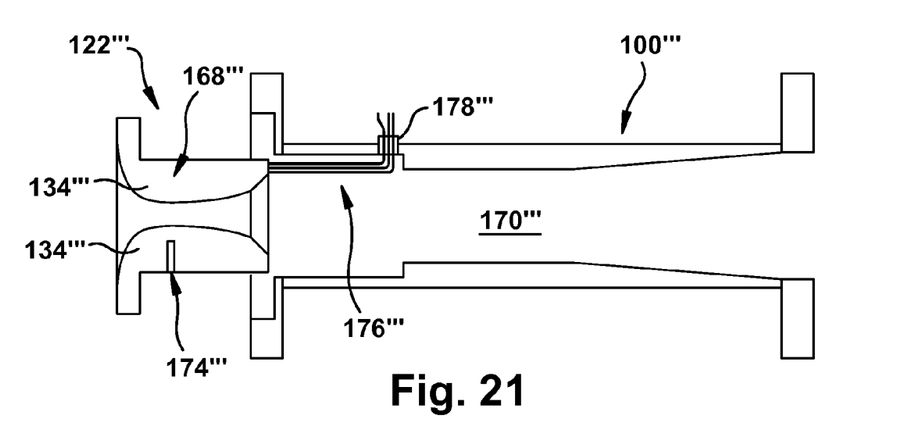
FIG. 21 is a schematic longitudinal sectional view of a flowmeter and yet another exemplary removable insert flow conditioner.

In some embodiments, the conditioning section 122 can be a separate, modular component that can be selectively inserted into or removed from the flowmeter 100. This can facilitate manufacturing of the conditioning section 122, which can be machined separately and then bolted, welded, or otherwise affixed to the main pipe body of the flowmeter. Forming the conditioning section 122 as a separate component can also allow the conditioning section to be more-easily formed from a different material than that used to form the main pipe body in which the conditioning section is disposed. For example, the conditioning section 122 can be ceramic and the pipe can be metal. A separate conditioning section 122 can also facilitate placement of multiple elements within the flowmeter via a single feed-through, which advantageously reduces the number of separate pipe wall penetrations. FIGS. 19-21 illustrate exemplary embodiments of removable insert-type conditioning sections. Except as indicated below and as will be readily apparent to a person having ordinary skill in the art, the structure and operation of the condition sections shown in FIGS. 19-21 are substantially identical to those of the conditioning section 122 described above.

As shown in FIG. 19, an exemplary removable condition section can include a sleeve or insert 122' that is sized and configured to be inserted into one end of the flowmeter 100'. The insert 122' includes a mating flange 162' that engages a corresponding shoulder portion 164' formed at the inlet end of the flowmeter 100'. One or more protrusions 134' of the type described above can be formed integrally with the insert 122' or can be coupled thereto. The insert 122' also includes cutouts or reliefs that allow the insert to be inserted around one or more sensors mounted in the flowmeter. For example, a first relief 166' can be formed to fit around a plurality of pressure sensors 168' mounted in the main pipe body 170', and a second relief 172' can be formed to fit around a temperature sensor 174' mounted in the main pipe body. The illustrated embodiment allows for the insert 122' to have a variable area ratio to support multiple flow rates, while allowing the main pressure boundary to be fixed.

FIG. 20 illustrates an exemplary insert 122" that is substantially identical to that shown in FIG. 19, except that the flow straightening protrusions are omitted or greatly reduced in profile.

FIG. 21 illustrates an exemplary insert 122''' that includes one or more embedded elements (e.g., temperature wells or sensors 174''', thickness gauges, corrosion sensors, pressure sensors 168''', isolation diaphragms, impulse lines, fluid-filled and isolation lines, local pressure sensors with integrated electronics, etc.). The tubing, wires, and so forth 176''' required to support the embedded elements can also be at least partially embedded in the insert 122''' (e.g., in one or more protrusions 134''' formed on or coupled to the insert) and can routed through a single feed-through 178''' to the exterior of the main pipe body 170'''. A sealing arrangement such as a glass-to-metal seal can be provided in the feed-through 178''' to seal the interior of the flowmeter 100'''. By embedding tubing, wiring, etc. in the insert, the insert is more compact and easier to install in the flowmeter. In addition, reducing the number of feed-throughs reduces the cost and complexity of the system as well as the number of possible failure points. The illustrated embodiment allows for the insert to have a variable area ratio to support multiple flow rates, while allowing the main pressure boundary to be fixed. In addition, the insert and its various embedded elements can be calibrated as a unit and can be installed and/or replaced very quickly.

Referring again to FIG. 8, after exiting the conditioning section 122, the flow enters the measurement section 124. Transducers 110 and other sensors can be mounted in or adjacent to the measurement section 124 to measure various characteristics of the flow as described above. The measurement section 124 can have a non-circular cross-section in a plane that is transverse to the longitudinal axis of the flow path 104. This non-circular shape can extend throughout the entire length of measurement section 124, or at least throughout a length of the measurement section along which one or more of the transducers 110 are disposed. In other words, the measurement section 124 can be configured such that no portion of a transverse cross-section taken through the measurement section defines a complete circle. Stated differently, the measurement section can be non-cylindrical and have a constant transverse cross-section along a length thereof. In the illustrated embodiment, material is added to (or is not removed from) the interior of the pipe 102 such that the cross-sectional area of the flow path 104 in the measurement section 124 is less than the cross-sectional area of the flow path in the inlet and outlet sections 120, 128. In other embodiments, however, the opposite can be true, wherein material is removed from (or is not added to) the interior of the pipe 102 such that the cross-sectional area of the flow path 104 in the measurement section 124 is greater than the cross-sectional area of the flow path in the inlet and outlet sections 120, 128. In some embodiments, the cross-sectional area of the flow path 104 in the measurement section 124 is sized relative to that of the inlet section 120 to maintain a predetermined contraction ratio (e.g., 0.6 to 0.7).

Figure 11:
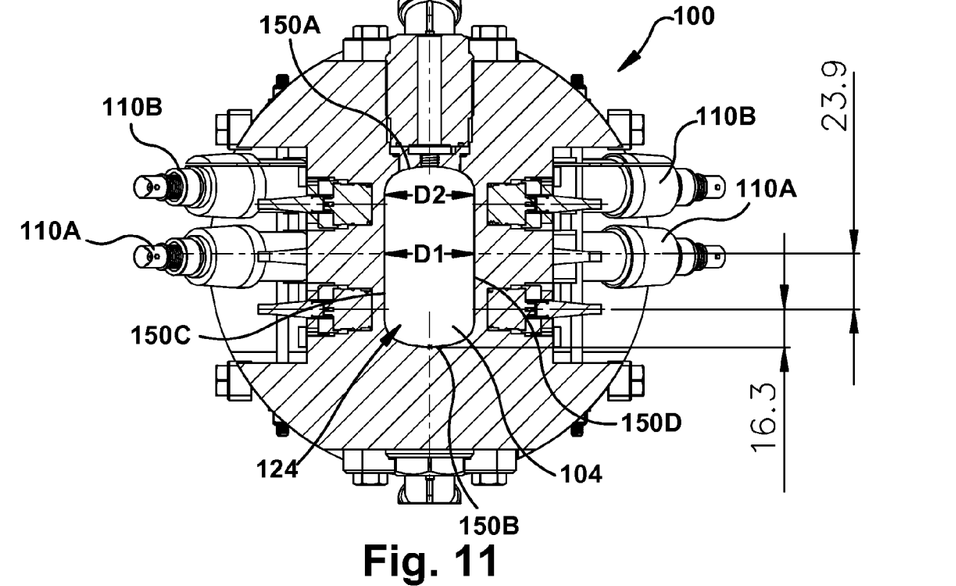
FIG. 11 is another transverse sectional view of the flowmeter of FIG. 1.
Figure 12:
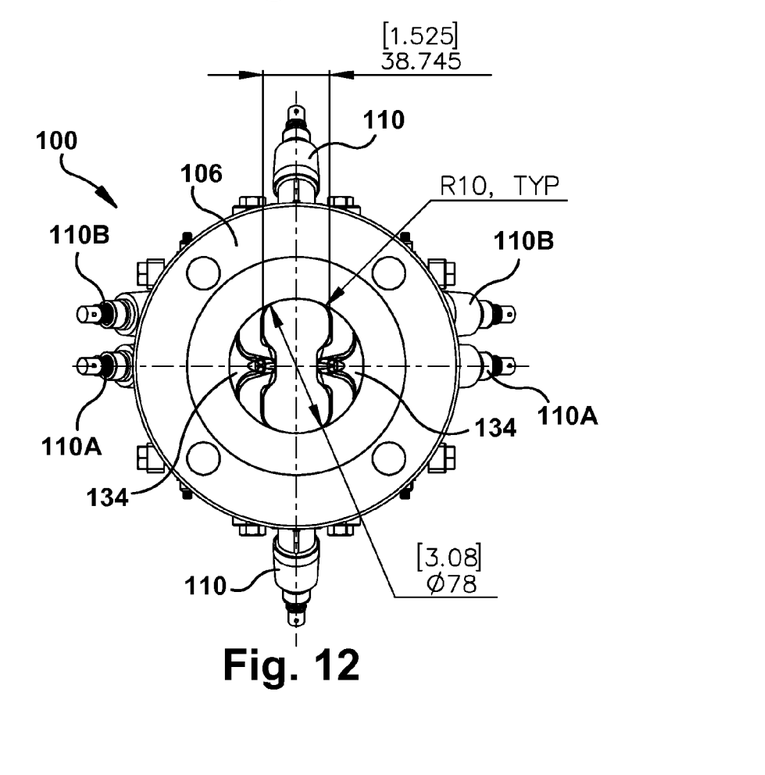
FIG. 12 is an end view of the flowmeter of FIG. 1.

As best shown in FIG. 11, the measurement section 124 has a transverse cross-section defined by first, second, third, and fourth surfaces or sidewalls 150A, 150B, 150C, 150D. In the illustrated embodiment, the first and second sidewalls 150A, 150B are curved (e.g., sections of a circle) and the third and fourth sidewalls 150C, 150D are planar. It will be appreciated, however, that various other configurations are possible. For example, all four sidewalls can be planar. By way of further example, all four sidewalls can be curved, with the first and second sidewalls being curved to a greater extent than the third and fourth sidewalls (e.g., the first and second sidewalls can be sections of a first circle and the third and fourth sidewalls can be sections of a second circle having a radius of curvature that is greater than that of the first circle). In such embodiments, the radius of curvature of the third and fourth sidewalls can be relatively large, such that the third and fourth sidewalls are close to being planar. As yet another example, any of the sidewalls can be sections of an ellipse, oval, or other complex shape. In the illustrated embodiment, the first and second sidewalls 150A, 150B are sections of a circle having a diameter of about 3.08 inches, and the third and fourth sidewalls 150C, 150D are parallel to one another and are spaced about 1.525 inches apart. It will be appreciated that these measurements are merely exemplary, and that the absolute and relative sizes of the surfaces can be adjusted based on various factors (e.g., the desired contraction ratio, the inlet diameter, the outlet diameter, etc.).

The flat or substantially flat surfaces of the third and fourth sidewalls provide excellent acoustic coupling for ultrasonic measurement. This is in contrast with traditional, circular-pipe flowmeters in which the circular sidewall bends and distorts the acoustic waves, reducing measurement accuracy or requiring complex and expensive compensation schemes.

By making the first and second sidewalls curved and transitioning gradually into the third and fourth sidewalls, the flowmeter can support high pressures with minimal deformation and stress concentrations, which can distort ultrasonic waves and reduce the durability of the flowmeter.

Forming an aperture with planar sidewalls and a reduced cross-sectional area also reduces the measurement distance between transmitter and receiver transducers as compared with traditional, circular-pipe flowmeters. As shown in FIG. 11, the distance D1 between paired centerline transducers 110A and the distance D2 between paired chordal transducers 110B are less than would be the case if a circular-pipe configuration were used. By minimizing the distance between paired transducers, measurement accuracy is improved.

The unique shape of the measurement section 124 also facilitates chordal measurements. In some embodiments, "chordal" measurements refer to ultrasonic flow measurements in which the transducers 110 are aimed along an axis which extends through a portion of the flow path 104 other than the center (e.g., through a half radius, a quarter radius, and so forth).

In general, a velocity gradient exists across the transverse cross-section of the flow path. Material flowing along the sidewalls and near the periphery of the flow path moves slowly or not at all, while material flowing through the center of the flow path moves quickly. Accordingly, measuring flow velocity using only centerline transducers can result in inaccurate measurements. These inaccuracies can be difficult to compensate for when multi-phase or multi-component flow exists, since different materials have different laminar flow profiles depending on viscosity and other factors. Measuring flow at chordal positions can improve accuracy since measurements can be taken at a point where the flow profiles of multiple materials converge. In addition, taking flow measurements at multiple points (e.g., a centerline position and one or more chordal positions, or at a plurality of chordal positions) and interpolating the flow profile between said points can further improve accuracy.

Figures 16, 17:
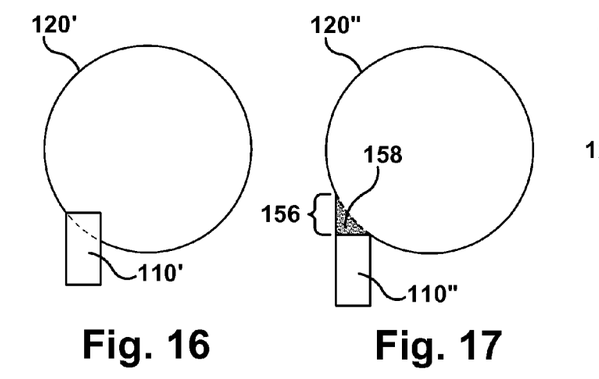
FIG. 16 is a schematic sectional view of a transducer proud mounted in a pipe.
FIG. 17 is a schematic sectional view of a transducer sub-flush mounted in a pipe.
Figure 18:
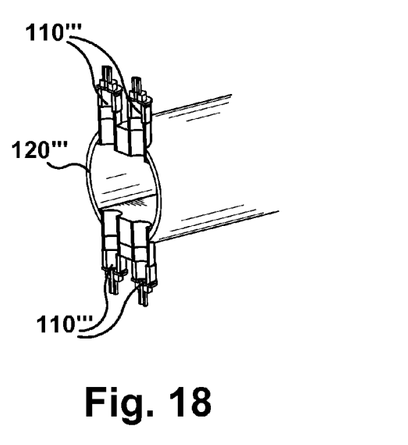
FIG. 18 is a schematic sectional view of a transducer flush mounted in a pipe.

Traditional, circular-pipe flowmeters are not conducive to chordal measurements because the transducers in chordal positions cannot be flush mounted relative to the sidewall of the pipe. A transducer 110' can be mounted at a chordal position such that it sits proud relative to the sidewall of the pipe 120', as shown in FIG. 16, however this exposes the transducer to lateral impacts from materials flowing through the pipe (e.g., rocks, sand, and so forth). A transducer 110" can also be mounted at a chordal position such that it sits sub-flush relative to the sidewall of the pipe 120", as shown in FIG. 17, however this leaves a recess 156 where debris or bubbles 158 can collect and interfere with the measurement. The non-circular measurement sections disclosed herein, on the other hand, allow transducers 110'" to be mounted at chordal positions such that they sit flush with the sidewall of the pipe 120'", as shown in FIG. 18. In this configuration, the transducer is not exposed to lateral impacts from materials flowing through the pipe and no recess in which debris or bubbles can collect is formed.

Referring again to FIG. 11, the illustrated flowmeter includes a pair (transmitter and receiver) of centerline transducers 110A and a pair (transmitter and receiver) of chordal transducers 110B. The centerline transducers 110A are positioned in the measurement section 124 at oblique angles relative to the longitudinal axis of the flow path 104 such that the transducers 110A are aimed at one another along an axis that extends through the center of the flow path. The chordal transducers 110B are positioned in the measurement section 124 at oblique angles relative to the longitudinal axis of the flow path 104 such that the transducers 110B are aimed at one another along an axis that does not extend through the center of the flow path. Rather, the axis of the chordal transducers 110B extends through a chordal position of the flow path 104 (e.g., a half radius, a quarter radius, a one-eighth radius, or any other non-center position). The centerline transducers 110A and the chordal transducers 110B are flush-mounted in the planar surfaces of the measurement section 124.

Mounting transducers or other sensors in this manner (i.e., in a measurement section 124 having a non-circular transverse cross-section) can also allow for the overall length and/or other dimensions of the flowmeter to be reduced, producing a more compact and less expensive design. For example, mounting multiple transducers or other sensors in a planar or substantially planar section of the flowmeter can eliminate the need to provide separate lead-in and lead-out sections for each sensor, thus reducing the overall flowmeter length. At the same time, since isolation diaphragms, impulse lines, and the like can be mounted flush with the planar pipe wall, they are protected from impacts by flow materials and no recesses exist where debris can become lodged or where abrasive eddy currents can form.

Figures 1, 2:
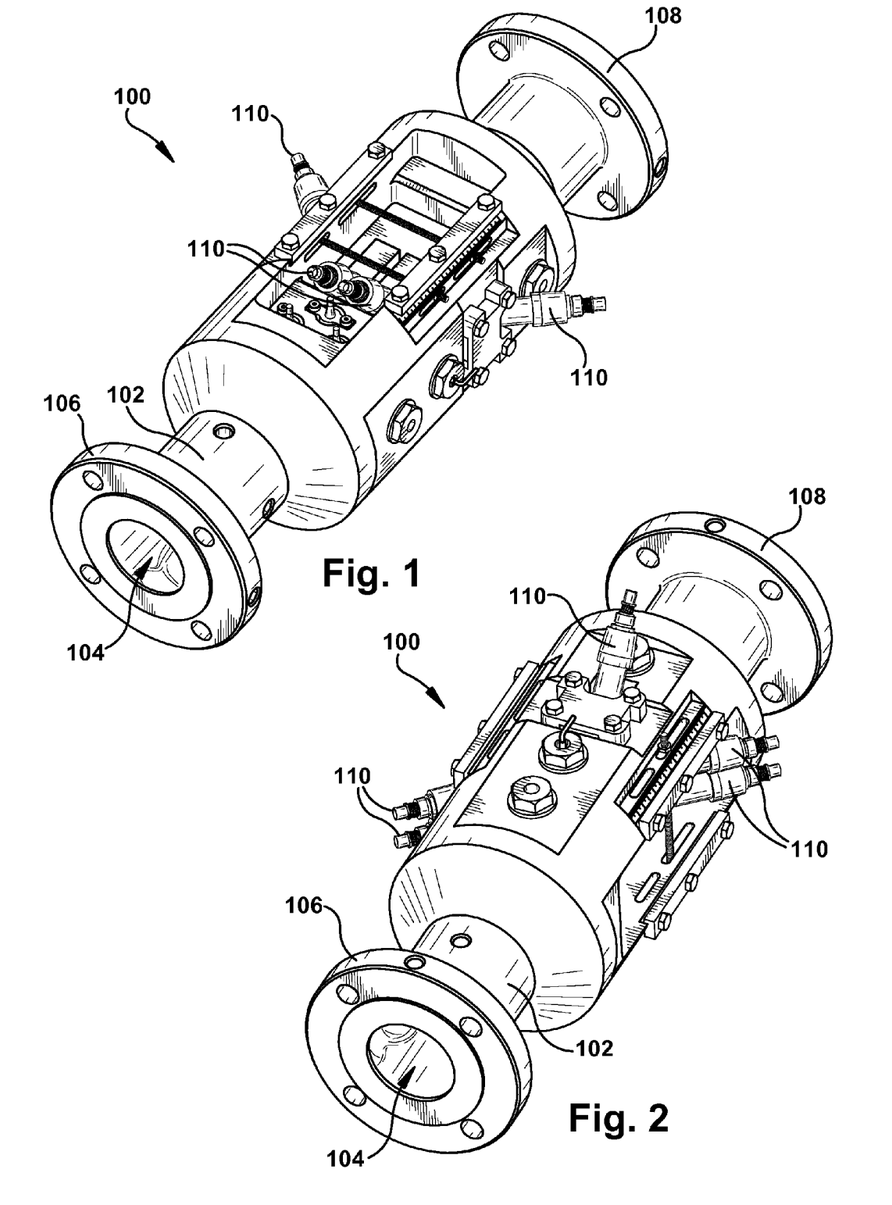
FIG. 1 is a perspective view of an exemplary flowmeter.
FIG. 2 is another perspective view of the flowmeter of FIG. 1.
Figure 3:
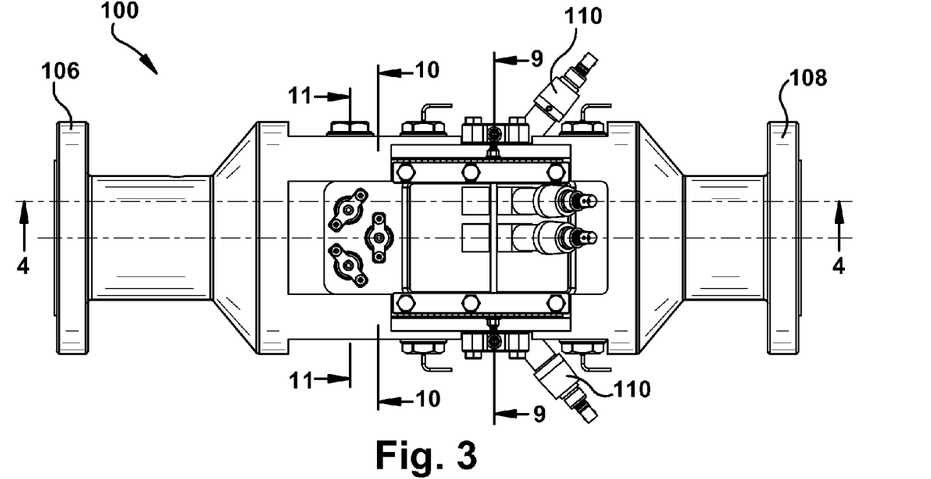
FIG. 3 is a plan view of the flowmeter of FIG. 1.
Figure 4:
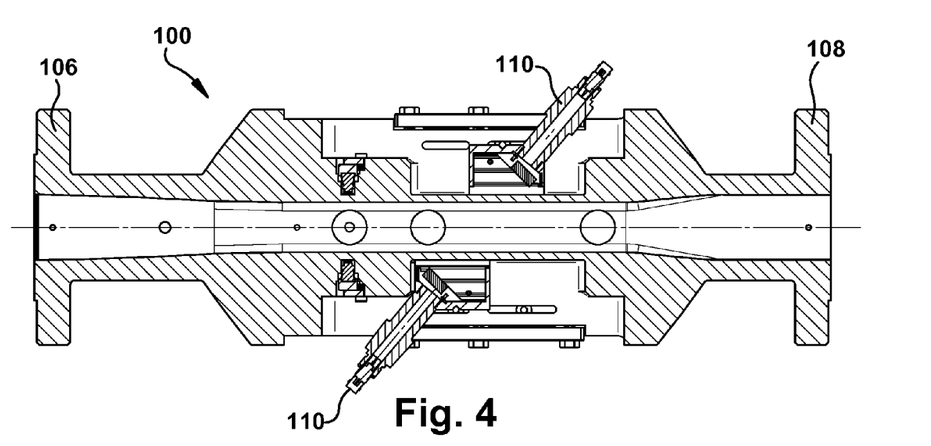
FIG. 4 is a longitudinal sectional view of the flowmeter of FIG. 1.
Figure 5:
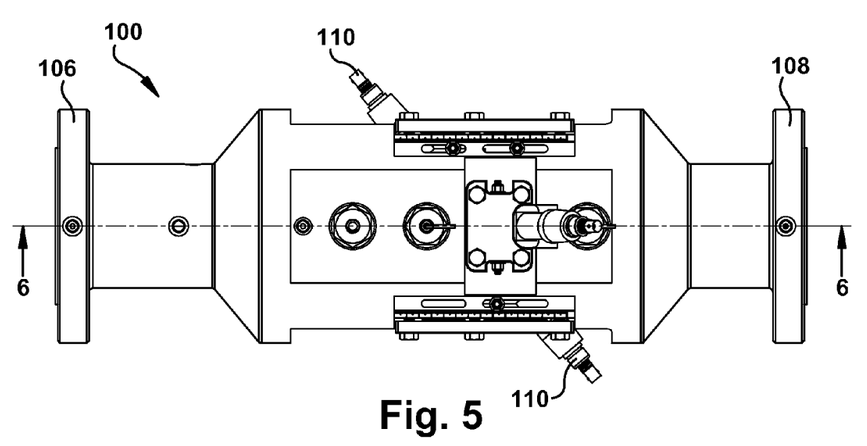
FIG. 5 is a profile view of the flowmeter of FIG. 1.
Figure 6:
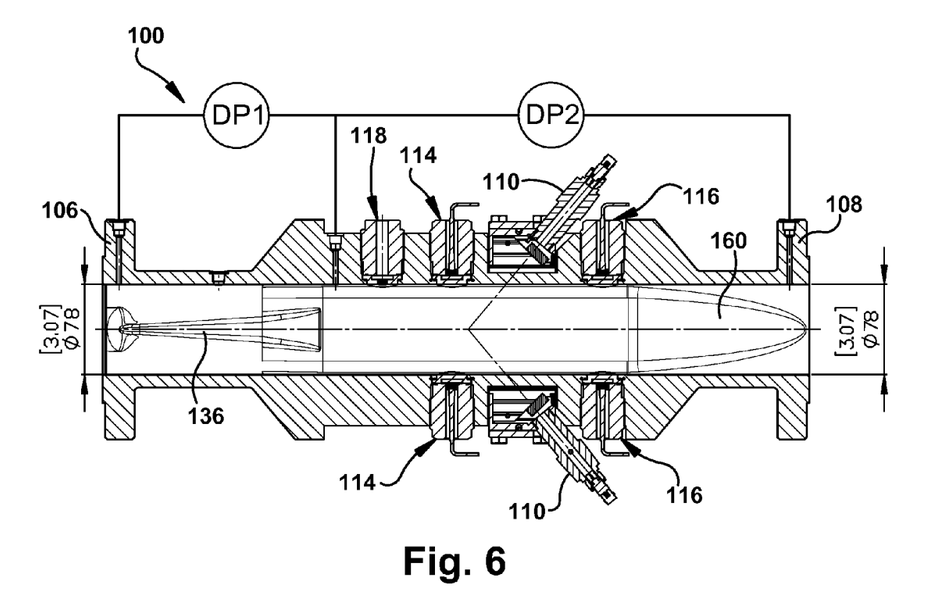
FIG. 6 is another longitudinal sectional view of the flowmeter of FIG. 1.
Figure 7:
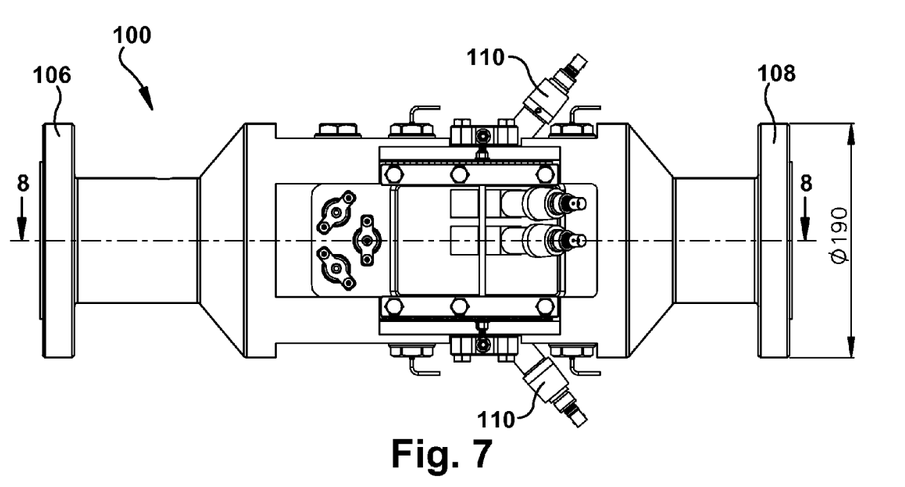
FIG. 7 is another plan view of the flowmeter of FIG. 1.

Upon exiting the measurement section 124, the flow passes through the transition section 126 which smoothes the transition between the measurement section and the outlet section 128. As shown in FIGS. 6 and 8, the transition section 126 can include simple ramps 160 that gradually blend from the non-circular cross-section of the measurement section 124 to the circular cross-section of the outlet section 128.

Like the inlet section 120, the outlet section 128 can be cylindrical and can have an inside diameter sized to substantially match the inside diameter of a downstream pipe into which the flow passes after exiting the flowmeter 100. In the illustrated embodiment, the inside diameter of the outlet section 128 is about 3.07 inches and the outside diameter of the outlet flange 108 is about 190 millimeters. It will be appreciated, however, that the flowmeter outlet 128, the outlet flange 108, or the entire flowmeter 100 can be scaled in size to fit pipelines of various dimensions.

The flowmeters disclosed herein and the various components thereof can be formed from any of a variety of materials including, without limitation, metals such as stainless steel, titanium, aluminum, iron, and/or combinations thereof.

In use, the flowmeter 100 is installed in-line in a pipeline through which a flow of material is conveyed. The flow is directed through the inlet section 120 and across the conditioning section 122 to remove or reduce swirling flow. The flow is then directed through the measurement section 124 where the ultrasonic waves are emitted from and received by the transducers 110 and converted to electrical outputs which can be processed to determine characteristics of the flow and inform further action. The ultrasonic waves can be emitted from flush-mounted chordal transducers, which can be optimized for liquid flow measurement, and from flush-mounted centerline transducers, which can be optimized for gas flow measurement. The flow is then directed through the transition section 126 and out of the flowmeter 100 through the outlet section 128.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A flowmeter, comprising: an elongate body having an inner surface, a first end and a second end;
   a flow path extending between the first and second ends along a longitudinal axis;
   an ultrasonic transducer disposed in a measurement section of the flow path and configured to emit ultrasonic waves into a material flowing through the flow path; and
   first and second protrusions formed in a conditioning section of the flow path upstream from the measurement section, the first and second protrusions each extending radially inward from the inner surface of the elongate body and being configured to reduce swirling flow through the measurement section, each protrusion comprising a first ramp and a second ramp extending radially inward from the inner surface to a central peak extending longitudinally along the flow path.

2. The flowmeter of claim 1, wherein the first and second protrusions are diametrically opposed from one another.

3. The flowmeter of claim 1, wherein the first and second protrusions are aligned with the center of respective planar surfaces of the measurement section.

4. The flowmeter of claim 1, wherein a longitudinal cross-section of each protrusion taken along a radius of the flow path and through the center of the protrusion has a height profile that includes an entrance ramp section, a fixed height section, and an exit ramp section.

5. The flowmeter of claim 4, wherein the entrance ramp section is defined by a concave ramp that begins at a sidewall of the flow path and transitions at an inflection point to a convex ramp which leads into the fixed height section.

6. The flowmeter of claim 4, wherein the fixed height section has a constant height along its length and defines the peak height of the protrusion.

7. The flowmeter of claim 4, wherein the exit ramp section is defined by a straight-line ramp that descends from the peak height to a sidewall of the measurement section.

8. The flowmeter of claim 1, wherein each protrusion has a height on either side of a central longitudinal plane of the protrusion that descends along a substantially concave path until the protrusion transitions to a sidewall of the flow path.

9. The flowmeter of claim 8, wherein the average slope at which the height on either side of the central longitudinal plane descends towards the sidewall decreases towards an outlet end of the protrusion.

10. The flowmeter of claim 1, wherein the first and second ramps on either side of the center peak of the protrusion climb in the longitudinal direction from the sidewall of an inlet section of the flow path to a planar sidewall of the measurement section.

11. The flowmeter of claim 1, wherein the first and second protrusions are formed on or coupled to an insert that can be selectively removed from or inserted into the flow path.

12. The flowmeter of claim 1, wherein at least one of the first and second protrusions includes an embedded temperature sensor, pressure sensor, pressure port, corrosion sensor, or thickness gauge.

13. A flowmeter, comprising: an elongate member having an inner surface and a flow path extending along a longitudinal axis thereof, the flow path including a measurement section in which at least one ultrasonic transducer configured to measure flow through the flow path is mounted and a conditioning section disposed upstream from the measurement section, the conditioning section comprising first and second protrusions each extending radially inward from the inner surface of the elongate body and being configured to reduce swirling flow through the measurement section, wherein the conditioning section provides a smooth transition in the longitudinal direction between a circular transverse cross-section of an inlet section and a non-circular transverse cross-section of the measurement section.

14. The flowmeter of claim 13, wherein the conditioning section comprises at least one protrusion that extends longitudinally through the flow path and radially inward from a sidewall of the flow path.

15. The flowmeter of claim 14, wherein the protrusion has a height profile in a central longitudinal plane that is fin-shaped with a blunt leading end and a tapered trailing end.

16. The flowmeter of claim 14, wherein the protrusion includes first and second ramped surfaces on either side of a center peak.

17. The flowmeter of claim 16, wherein the width of the center peak increases towards an outlet end of the protrusion and the width of the first and second ramped surfaces decreases towards the outlet end of the protrusion.

18. The flowmeter of claim 16, wherein the center peak forms a longitudinal rib that extends into the flow path to disrupt swirling flow.

19. The flowmeter of claim 14, wherein the peak height of the protrusion is less than the radius of an inlet section disposed upstream from the conditioning section.

20. The flowmeter of claim 14, wherein the protrusion is configured such that a longitudinal path through the center of the flow path is clear.

21. The flowmeter of claim 14, wherein the protrusion comprises first and second diametrically opposed protrusions.

22. The flowmeter of claim 14, wherein the protrusion is formed on or coupled to an insert that can be selectively removed from or inserted into the flow path.

23. The flowmeter of claim 14, wherein the protrusion includes an embedded temperature sensor, pressure sensor, pressure port, corrosion sensor, or thickness gauge.

\* \* \* \* \*